Figures 1, 2:
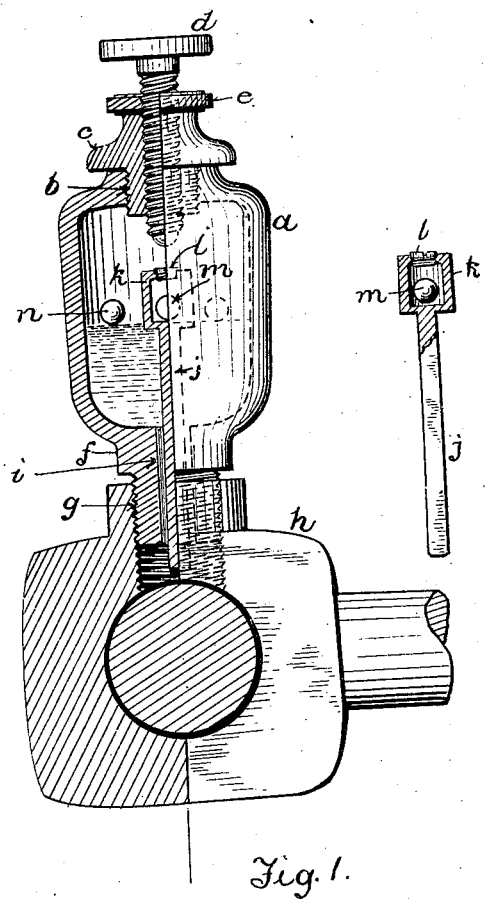

No. 861,165.

PATENTED JULY 23, 1907.

J. H. DAVIS.
OIL CUP.
APPLICATION FILED JUNE 22, 1906.

Witnesses:
S. M. Philbrick
Cecil Long

Inventor:
James H. Davis
by T. J. Geisler
Att'y.

THE NORRIS PETERS CO., WASHINGTON, D. C.

UNITED STATES PATENT OFFICE.

JAMES H. DAVIS, OF PORTLAND, OREGON, ASSIGNOR TO C. H. MALLORY.

OIL-CUP.

No. 861,165.  Specification of Letters Patent.  Patented July 23, 1907.

Application filed June 22, 1906. Serial No. 322,966.

*To all whom it may concern:*

Be it known that I, JAMES H. DAVIS, a citizen of the United States, and a resident of Portland, Multnomah county, State of Oregon, have invented a new and useful Improvement in Oil-Cups, of which the following is a specification, reference being had to the accompanying drawings as constituting a part thereof.

My invention relates to oil cups which are designed to feed lubricant to crank pins, or movable bearings of an engine, and has for its object to provide a cup which is especially adapted to contain semi-solid or solid lubricant, or what is commonly known as "hard oil," and to feed such lubricant to the bearings in a controllable and dependable manner.

I attain my object by the devices shown in the drawings and hereinafter described.

In the drawings, Figure 1 represents in its right half an elevation of my oil cup installed as in practice, and the left half thereof is a section; and Fig. 2 is a detail, partly in section, of what I term the vibratable pin.

The letters designate the parts referred to.

My invention comprises a hollow cylindrical body $a$, the head of which is made with a threaded aperture $b$, in which to receive an adjustment-screw $d$. On the shank of such adjustment-screw is placed a lock-nut $e$, so that when the adjustment has been made, as hereinafter described, the screw $d$ may be locked against turning up or down because of the vibrations of the engine. The bottom of the body $a$, is made with a neck $f$, having a threaded reduced portion $g$, arranged to be inserted in the threaded hole of the bearing $h$, as usual; and such bottom part is provided with a vertical aperture $i$. In the latter is inserted the shank of a vibratable pin $j$, comprising a shank and a hollow head $k$. The shank of such pin $j$, is made square in cross section, or at all events, with flat faces, so as to leave a passage-way between such faces and the wall of the aperture $i$, in the base of the cup, for the lubricant to pass through to the bearings. The hollow head $k$ is made with a removable plug $l$, and in such hollow head is placed a ball $m$, which ball constitutes a loose weight, and during the vibrations of the engine contributing the energy imparted to it by the motion of the crank disk, for example, toward inducing a vibratory, or up- and-down motion of the vibratable pin, in the aperture $i$. Within the body $a$, are placed two or more balls $n$, representing loose weights, which during the run of the engine, pound the upper surface of the lubricant and help to feed the same to the bearing. The vibrations of the pin $j$, causes a steady feed of lubricant to the bearings and the up-and-down motion or stroke of the pin is controlled by the adjustment of the screw $d$. It is thus apparent, that my device taken as a whole, constitutes what may be termed a ball and pin feed oil cup.

The advantage of my device is that it does not feed lubricant while the engine is at rest, but as soon as the engine starts up, the vibratable pin $j$ feeds a small quantity of the lubricant with each up-and-down motion thereof.

I claim:

1. The combination with an oil-cup, the base of which is made with a vertical central aperture, of a vibration pin, the walls of the aperture and the faces of the shank of such pin being adapted to leave a passage-way for the lubricant between them; said pin being made with a hollow head; a loose-weight in such hollow head, and adjustment means in the head of the cup adapted to control the vibrations of the pin.

2. The combination with an oil-cup, the base of which is made with a vertical central aperture, of a vibration pin, contained in such aperture, the walls of the aperture and the faces of the shank of such pin being adapted to leave a passage-way for the lubricant between them; said pin being made with a hollow head; a removable plug in such head, so that a loose weight may be inserted therein; loose weights in the body of the cup, and adjustment means in the head of the cup adapted to control the vibrations of the pin.

3. An oil-cup comprising a hollow body, the base of which is made with a vertical central aperture, a vibratable pin contained in such aperture, the walls of the latter and the faces of the shank of the pin being relatively formed, so as to leave a passage-way for the lubricant between them; said pin being made with a hollow head; a loose weight contained in such head; a centrally apertured cap removably affixed in the head of the cup, a set-screw, in the aperture of the cap, whereby to control the vibrations of the pin; and a lock-nut on the shank of the set-screw.

JAMES H. DAVIS.

Witnesses:
C. H. MALLORY,
T. J. GEISLER.